United States Patent
Chen et al.

(10) Patent No.: US 9,347,641 B2
(45) Date of Patent: May 24, 2016

(54) OPTICAL FILM

(71) Applicant: Beautylight Optronics Co., Ltd, HsinChu (TW)

(72) Inventors: Liang-Shiun Chen, Taichung (TW); Shu-Wei Chen, Taoyuan County (TW); Shi-Hao Liu, Hsinchu (TW)

(73) Assignee: Beautylight Optronics Co., Ltd, HsinChu (TW)

( * ) Notice: Subject to any disclaimer, the term of this patent is extended or adjusted under 35 U.S.C. 154(b) by 92 days.

(21) Appl. No.: 14/527,782

(22) Filed: Oct. 30, 2014

(65) Prior Publication Data
US 2015/0338052 A1    Nov. 26, 2015

(30) Foreign Application Priority Data

May 22, 2014 (TW) ............................. 103117944 A

(51) Int. Cl.
*F21V 5/00* (2015.01)
*G02B 27/09* (2006.01)
*F21Y 101/02* (2006.01)

(52) U.S. Cl.
CPC ............ *F21V 5/007* (2013.01); *G02B 27/0905* (2013.01); *G02B 27/095* (2013.01); *F21Y 2101/02* (2013.01)

(58) Field of Classification Search
CPC .......... F21V 5/007; F21V 5/008; F21V 5/02; F21V 5/04; G02B 27/0905; G02B 27/095
USPC ................................................ 362/331, 332
See application file for complete search history.

(56) References Cited

U.S. PATENT DOCUMENTS

| | | | | |
|---|---|---|---|---|
| 6,456,437 | B1* | 9/2002 | Lea | F21V 5/02 359/625 |
| 7,384,173 | B2* | 6/2008 | Whitney | G02B 5/045 349/65 |
| 7,859,759 | B2* | 12/2010 | Coyle | G02B 5/045 359/625 |
| 8,545,062 | B2 | 10/2013 | Lin et al. | |
| 2006/0250707 | A1* | 11/2006 | Whitney | G02B 5/045 359/831 |
| 2006/0256582 | A1* | 11/2006 | Chuang | G02B 5/045 362/620 |
| 2008/0037947 | A1* | 2/2008 | Chao | G02B 3/0025 385/146 |
| 2012/0075870 | A1* | 3/2012 | Kayanuma | F21V 5/04 362/311.06 |
| 2012/0126261 | A1* | 5/2012 | Shimizu | G02F 1/133603 257/88 |
| 2013/0201660 | A1* | 8/2013 | Barbier | B32B 33/00 362/97.1 |

FOREIGN PATENT DOCUMENTS

TW    M314349    6/2007
TW    201122577    7/2011

* cited by examiner

*Primary Examiner* — Ali Alavi
(74) *Attorney, Agent, or Firm* — Jianq Chyun IP Office

(57) ABSTRACT

An optical film including a substrate and a first material layer is provided. The first material layer includes a plurality of first optical structures and a plurality of first auxiliary optical structures. Each of the first optical structures includes a first base portion and a first rounded portion. The first base portion has a first bottom surface connected to the substrate and a first top surface opposite to the first bottom surface. The first rounded portion is disposed on the first top surface, and the first rounded portion has a first arc surface. Each of the first auxiliary optical structures has a first auxiliary arc surface. The first optical structures and the first auxiliary optical structures extend along a first extending direction and being alternately arranged on the substrate in an arranging direction perpendicular to the first extending direction.

28 Claims, 9 Drawing Sheets

OPTICAL FILM

CROSS-REFERENCE TO RELATED APPLICATION

This application claims the priority benefit of Taiwan application serial no. 103117944, filed on May 22, 2014. The entirety of the above-mentioned patent application is hereby incorporated by reference herein and made a part of this specification.

BACKGROUND OF THE INVENTION

1. Field of the Invention

The invention relates to an optical film, and more particularly, relates to an optical film adapted to cooperate with a spot light source arranged in arrays.

2. Description of Related Art

In recent years, a light emitting diode (LED) light source has been widely applied in various lighting apparatus applications for it is advantageous in having compact size, low power consumption, long operating life, and so forth. However, a spot light source arranged in arrays can easily cause non-uniformity permutation to occur on light source distribution, and use of multiple spot light sources also leads to increases in manufacturing costs. Therefore, how to compose uniform linear light source or planar light source from the spot light source with limited quantity and arranged in arrays has become one of important issues to be solved.

SUMMARY OF THE INVENTION

The invention is directed to an optical film, which has favorable optical characteristics.

An optical film of the invention includes a substrate and a first material layer. The substrate has a first surface and a second surface opposite to the first surface. The first material layer includes a plurality of first optical structures and a plurality of first auxiliary optical structures. Each of the first optical structures includes a first base portion and a first rounded portion. The base portion has a first bottom surface connected to the first surface and a first top surface opposite to the first bottom surface. The first rounded portion is disposed on the first top surface, and the first rounded portion has a first arc surface. Each of the first auxiliary optical structures has a first auxiliary arc surface, the first optical structures and the first auxiliary optical structures extend along a first extending direction, and the first optical structures and the first auxiliary optical structures are alternately arranged in an arranging direction perpendicular to the first extending direction on the first surface.

In an embodiment of the invention, curvature radii of the first arc surface and the first auxiliary arc surface are identical.

In an embodiment of the invention, curvature radii of the first arc surface and the first auxiliary arc surface are not identical.

In an embodiment of the invention, a height of each of the first optical structures is H1, a width of the first bottom surface in the arranging direction is W1, and H1 and W1 satisfy a relational expression as follows:

$$0.1 \leq H1/W1 \leq 10.$$

In an embodiment of the invention, a height of each of the first optical structures is H1, a width of the first bottom surface in the arranging direction is W1, and H1 and W1 satisfy a relational expression as follows:

$$1 \leq H1/W1 \leq 1.5.$$

In an embodiment of the invention, the first base portion of each of the first optical structure further includes a plurality of first inclined surfaces connected to the first bottom surface and the first top surface, and an included angle between each of the first inclined surfaces and the first bottom surface is less than 90 degrees.

In an embodiment of the invention, each of the first inclined side surfaces is a plane surface.

In an embodiment of the invention, each of the first inclined side surfaces is an arc surface.

In an embodiment of the invention, each of the first inclined side surfaces includes at least one plane surface and at least one arc surface.

In an embodiment of the invention, the optical film further includes a second material layer. The second material layer includes a plurality of second optical structures and a plurality of second auxiliary optical structures. Each of the second optical structures includes a second base portion and a second rounded portion. The second base portion has a second bottom surface connected to the second surface and a second top surface opposite to the second bottom surface. The second rounded portion is disposed on the second top surface, and the second rounded portion has a second arc surface. Each of the second auxiliary optical structures has a second auxiliary arc surface, the second optical structures and the second auxiliary optical structures extend along a second extending direction, and the second optical structures and the second auxiliary optical structures are alternately arranged in an arranging direction perpendicular to the second extending direction on the second surface.

In an embodiment of the invention, curvature radii of the second arc surface and the second auxiliary arc surface are identical.

In an embodiment of the invention, curvature radii of the second arc surface and the second auxiliary arc surface are not identical.

In an embodiment of the invention, a height of each of the second optical structures is H2, a width of the second bottom surface in the arranging direction is W2, and H2 and W2 satisfy a relational expression as follows:

$$0.1 \leq H2/W2 \leq 10.$$

In an embodiment of the invention, a height of each of the second optical structures is H2, a width of the second bottom surface in the arranging direction is W2, and H2 and W2 satisfy a relational expression as follows:

$$1 \leq H2/W2 \leq 1.5.$$

In an embodiment of the invention, the second base portion of each of the second optical structure further includes a plurality of second inclined surfaces connected to the second bottom surface and the second top surface, and an included angle between each of the second inclined surfaces and the second bottom surface is less than 90 degrees.

In an embodiment of the invention, each of the second inclined side surfaces is a plane surface.

In an embodiment of the invention, each of the second inclined side surfaces is an arc surface.

In an embodiment of the invention, each of the second inclined side surfaces includes at least one plane surface and at least one arc surface.

In an embodiment of the invention, an included angle between the first extending direction and the second extending direction is between 90 degrees and 130 degrees.

In an embodiment of the invention, refractive indexes of the second optical structures and the second auxiliary optical structures of the second material layer are identical, refractive indexes of the first optical structures and the first auxiliary optical structures of the first material layer are identical, and refraction indexes of the second material layer, the substrate and the first material layer are identical.

In an embodiment of the invention, refractive indexes of the second optical structures and the second auxiliary optical structures of the second material layer are identical, refractive indexes of the first optical structures and the first auxiliary optical structures of the first material layer are identical, and refraction indexes of the second material layer, the substrate and the first material layer are not identical.

In an embodiment of the invention, the refractive index of the first material layer is greater than the refractive index of the substrate, and the refractive index of the substrate is greater than the refractive index of the second material layer.

In an embodiment of the invention, the first material layer further includes a plurality of first optical particles distributed in the first optical structures and the first auxiliary optical structures, and a refractive index of each of the first optical particles is different from refractive indexes of the first optical structures and the first auxiliary optical structures.

In an embodiment of the invention, the second material layer further includes a plurality of second optical particles distributed in the second optical structures and the second auxiliary optical structures, and a refractive index of each of the second optical particles is different from refractive indexes of the second optical structures and the second auxiliary optical structures.

In an embodiment of the invention, the optical film further includes a first adhesive layer, wherein the first adhesive layer is disposed between the first material layer and the substrate.

In an embodiment of the invention, the first adhesive layer has a plurality of third optical particles, and a refractive index of the third optical particles is different from refractive indexes of the first optical structures and the first auxiliary optical structures.

In an embodiment of the invention, the optical film further includes a second adhesive layer, wherein the second adhesive layer is disposed between the second material layer and the substrate.

In an embodiment of the invention, the second adhesive layer has a plurality of fourth optical particles, and a refractive index of the fourth optical particles is different from refractive indexes of the second optical structures and the second auxiliary optical structures.

Based on above, the optical film according to the embodiments of the invention is capable of composing the uniform linear light source and planer light source from the spot light source with limited quantity and arranged in arrays.

To make the above features and advantages of the disclosure more comprehensible, several embodiments accompanied with drawings are described in detail as follows.

DESCRIPTION OF THE EMBODIMENTS

Figure 1A:
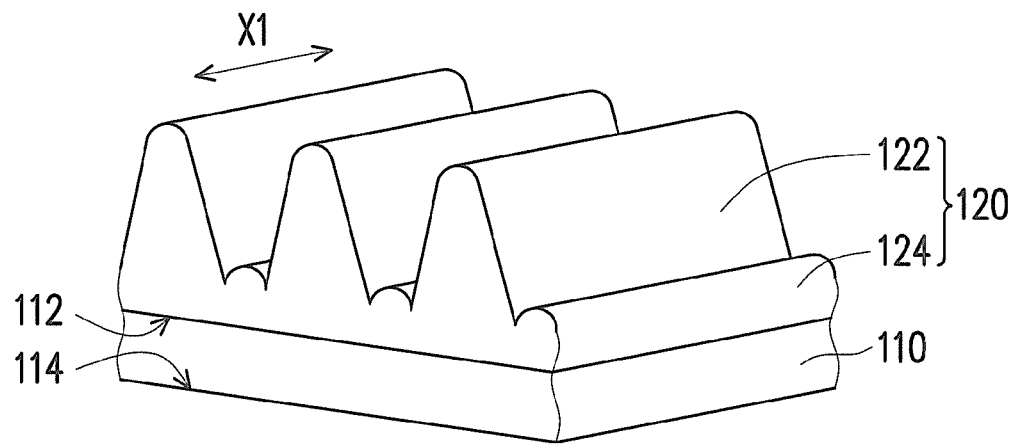
FIG. 1A is a three-dimensional view of an optical film according to first embodiment of the invention.
Figure 1B:
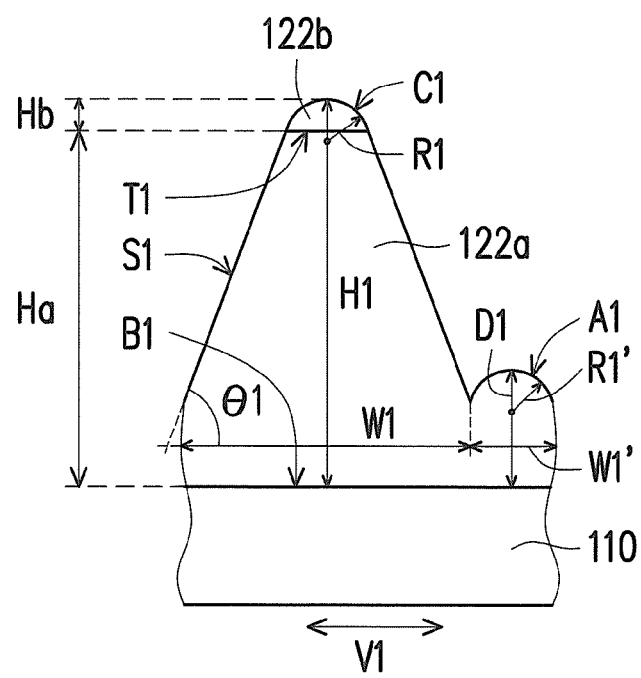
FIG. 1B is a cross-sectional view of the optical film according to FIG. 1A.
Figure 1C:
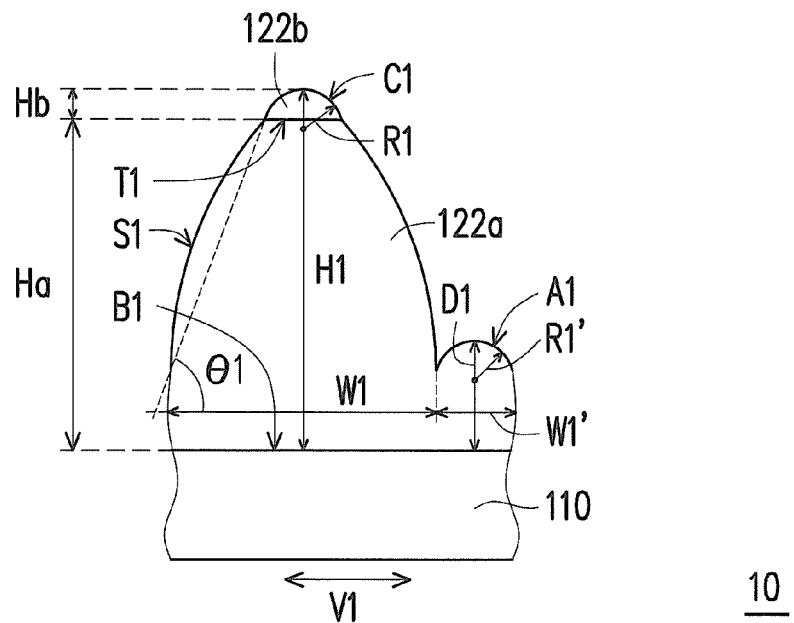
FIG. 1C is another cross-sectional view of the optical film according to FIG. 1A.
Figure 1D:
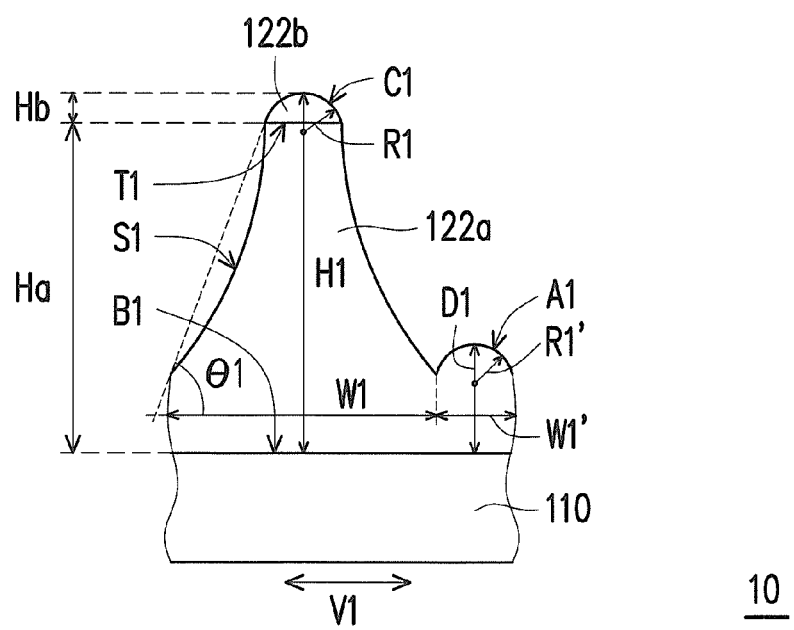
FIG. 1D is yet another cross-sectional view of the optical film according to FIG. 1A.

FIG. 1A is a three-dimensional view of an optical film according to first embodiment of the invention. FIG. 1B is a cross-sectional view of the optical film according to FIG. 1A, and has an orientation of section being a plane along an arranging direction V1 and perpendicular to a first surface 112. Referring to FIG. 1A and FIG. 1B together, an optical film 10 of the present embodiment includes a substrate 110 and a first material layer 120. The substrate 110 has a first surface 112 and a second surface 114 opposite to the first surface 112. The first material layer 120 includes a plurality of first optical structures 122 and a plurality of first auxiliary optical structures 124. Each of the first optical structures 122 includes a first base portion 122a and a first rounded portion 122b. The first base portion 122a has a first bottom surface B1 connected to the first surface 112 and a first top surface T1 opposite to the first bottom surface B1. The first rounded portion 122b is disposed on the first top surface T1, and the first rounded portion 122b has a first arc surface C1. Each of the first auxiliary optical structures 124 has a first auxiliary arc surface A1. The first optical structures 122 and the first auxiliary optical structures 124 extend along a first extending direction X1, and the first optical structures 122 and the first auxiliary optical structures 124 are alternately arranged on the first surface 112 in the arranging direction V1 perpendicular to the first extending direction X1. A curvature radius R1 of the first arc surface C1 and a curvature radius R1' of the first auxiliary arc surface A1 may be identical, or the curvature radius R1 of the first arc surface C1 and the curvature radius R1' of the first auxiliary arc surface A1 may be not identical. Hereinafter, for clear explanation, the following descriptions are all provided in the condition where the curvature radius R1 of the first arc surface C1 and the curvature radius R1' of the first auxiliary arc surface A1 are identical.

Specifically, in the present embodiment, a height of each of the first optical structures 122 is H1, and a width of the first bottom surface B1 in the arranging direction V1 is W1. The height H1 of each of the first optical structures 122 is equal to a height Ha of the first base portion 122a plus a height Hb of the first rounded portion 122b, and the height Hb of the first rounded portion 122b may not equal to the curvature radius R1 of the first arc surface C1. A height of each of the first auxiliary optical structures 124 is D1, and a width of each of the first auxiliary optical structures 124 in the arranging direction V1 is W1'. In addition, the first base portion 122a of each of the first optical structures 122 further includes a plurality of first inclined side surfaces S1 connected to the first bottom surface B1 and the first top surface T1.

In addition to the above, FIG. 1C to FIG. 1F are possible cross-sectional views of the optical film according to FIG. 1A. In the present embodiment, each of the first inclined side surfaces S1 may be a plane surface, an arc surface, or includes at least one plane surface and at least one arc surface. Further, a plurality of first vertical side surfaces (not illustrated) may be further provided at where the first bottom surface B1 is connected to the first inclined side surfaces S1. Sequentially, as shown in FIGS. 1B to 1F, a sectional shape of the first base portion 122a is a symmetrical hexagon in which the first inclined side surface S1 is a straight line (FIG. 1B); a sectional shape of the first base portion 122a is a symmetrical hexagon in which the first inclined side surface S1 is a convex arc line (FIG. 1C); a sectional shape of the first base portion 122a is a symmetrical hexagon in which the first inclined side surface S1 is a concave arc line (FIG. 1D); a sectional shape of the first base portion 122a is a symmetrical polygon in which the first inclined side surface S1 is composed of a straight line and an arc line (FIG. 1E); or a sectional shape of the first base portion 122a is a symmetrical polygon in which the first inclined side surface S1 is alternately composed of a plurality of straight lines and a plurality of arc lines (FIG. 1F), wherein a symmetrical axis of said sectional shapes is an extended axis passing through a circle center of the first arc surface C1 and perpendicular to the first bottom surface B1. Hereinafter, for clear explanation, the following descriptions are provided in the condition where the sectional shape of the first base portion 122a is the symmetrical hexagon in which the first inclined side surface S1 is the straight line.

It should be noted that, in the present embodiment, the height D1 of each of the first auxiliary optical structures 124 may be less than the height H1 of each of the first optical structures 122; or the height D1 of each of the first auxiliary optical structures 124 may be equal to the height H1 of each of the first optical structures 122, and a contour of each of the first auxiliary optical structures 124 together with each of the first optical structures 122 may be of the same size (not illustrated).

Specifically, in the present embodiment, when the curvature radius R1 of the first arc surface C1 and the curvature radius R1' of the first auxiliary arc surface A1 in the optical film 10 are less than 100 μm, an included angle θ1 between each of the first inclined side surfaces S1 and the first bottom surface B1 is less than 90 degrees, and the height H1 of each of the first optical structures 122 and the height W1 of the first bottom surface B1 in the arranging direction V1 satisfy a relational expression: $0.1 \leq H1/W1 \leq 10$; and more preferably, when the height H1 of each of the first optical structures 122 and the height W1 of the first bottom surface B1 in the arranging direction V1 satisfy a relational expression: $1 \leq H1/W1 \leq 1.5$, the spot light source with limited quantity and arranged in arrays may compose the uniform linear light source.

For instance, in the present embodiment, a simulation is performed by using light emitting diodes arranged in 3×3 array with intervals being 10 cm as the spot light source. In case the optical film 10 is not disposed, a root mean square (RMS) value of a standard deviation and an average value of luminance is 4.7 in the condition where a detection area is 30×30 cm$^2$ and a pixel amount is 300×300. When the optical film 10 is disposed at a place that is 10 cm from the light source, in the condition where the height H1 of each of the first optical structures 122 is 60 μm, and a total of the width W1 of each of the first optical structures 122 in the arranging direction V1 and the width W1' of each of the first auxiliary optical structures 124 in the arranging direction V1 is 64 μm, the root mean square (RMS) value of the standard deviation and the average value of luminance is 2 in the condition where the detection area is 30×30 cm$^2$ and the pixel amount is 300×300. Because a uniformity of light ray is inversely proportional to the RMS value, it can be known that, by disposing the optical film 10, the spot light source with limited quantity and arranged in arrays may compose the linear light source which is more uniform.

Figure 2A:
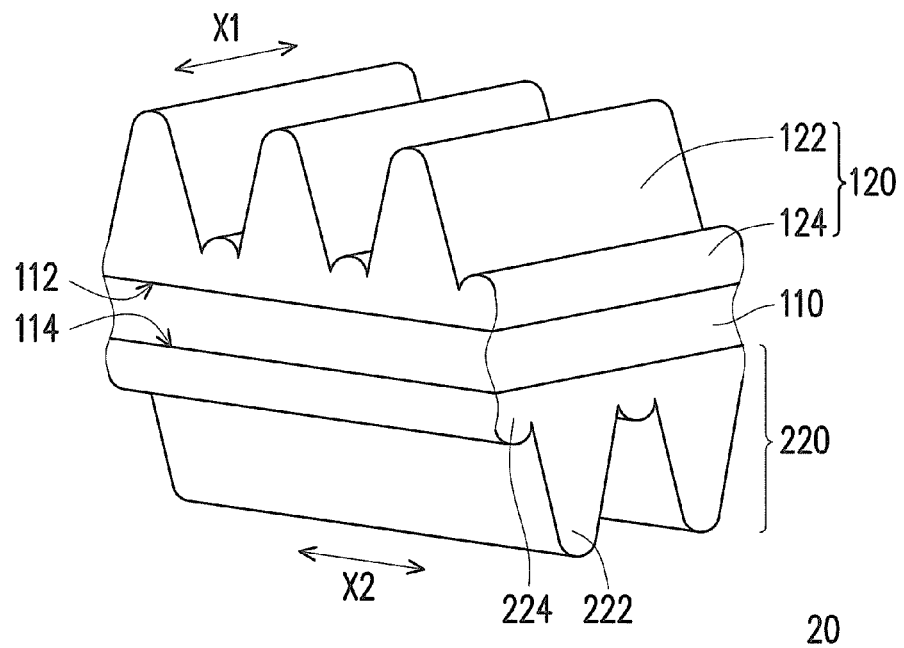
FIG. 2A is a three-dimensional view of an optical film according to second embodiment of the invention.
Figure 2B:
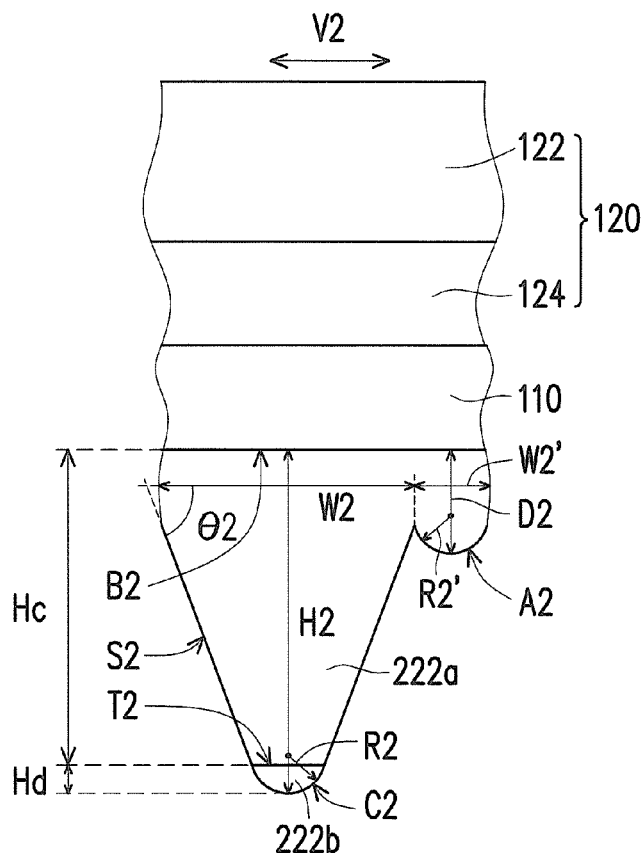
FIG. 2B is a cross-sectional view of the optical film according to FIG. 2A.

Next, FIG. 2A is a three-dimensional view of an optical film according to second embodiment of the invention. FIG. 2B is a cross-sectional view of the optical film according to FIG. 2A, and has an orientation of section being a plane along an arranging direction V2 and perpendicular to a second surface 114. Referring to FIG. 2A and FIG. 2B, in the present embodiment, an optical film 20 is similar to the optical film 10, thus similar components are represented by the same reference number to include similar functions, and the descriptions thereof are omitted. A major different between the optical film 20 and the optical film 10 is that, the optical film 20 further includes a second material layer 220.

The second material layer 220 includes a plurality of second optical structures 222 and a plurality of second auxiliary optical structures 224. Each of the second optical structures 222 includes a second base portion 222a and a second rounded portion 222b. The second base portion 222a has a second bottom surface B2 connected to the second surface 114 and a second top surface T2 opposite to the second bottom surface B2. The second rounded portion 222b is disposed on the second top surface T2, and the second rounded portion 222b has a second arc surface C2. Each of the second auxiliary optical structures 224 has a second auxiliary arc surface A2. The second optical structures 222 and the second auxiliary optical structures 224 extend along a second extending direction X2, and the second optical structures 222 and the second auxiliary optical structures 224 are alternately arranged on the second surface 114 in the arranging direction V2 perpendicular to the second extending direction X2. A curvature radius R2 of the second arc surface C2 and a curvature radius R2' of the second auxiliary arc surface A2 may be identical, or the curvature radius R2 of the second arc surface C2 and the curvature radius R2' of the second auxiliary arc surface A2 may be not identical. Hereinafter, for clear explanation, the following descriptions are all provided in the condition where the curvature radius R2 of the second arc surface C2 and the curvature radius R2' of the second auxiliary arc surface A2 are identical. An included angle between the first extending direction X1 and the second extending direction X2 is between 90 degrees and 130 degrees. For clear explanation, the following descriptions are all provided in the condition where the included angle between the first extending direction X1 and the second extending direction X2 is 90 degrees for example.

Specifically, in the present embodiment, a height of each of the second optical structures 222 is H2, and a width of the second bottom surface B2 in the arranging direction V2 is W2. The height H2 of each of the second optical structures 222 is equal to a height Hc of the second base portion 222a plus a height Hd of the second rounded portion 222b, and the height Hd of the second rounded portion 222b may not equal to the curvature radius R2 of the second arc surface C2. A height of each of the second auxiliary optical structures 224 is D2, and a width of each of the second auxiliary optical structures 224 in the arranging direction V2 is W2'. In addition, the second base portion 222a of each of the second optical structures 222 further includes a plurality of second inclined side surfaces S2 connected to the second bottom surface B2 and the second top surface T2. Herein, each of the second inclined side surfaces S2 may be a plane surface, an arc surface, or includes at least one plane surface and at least one arc surface. Further, a plurality of second vertical side surfaces (not illustrated) may be further provided at where the second bottom surface B2 is connected to the second inclined side surfaces S2. Hereinafter, for clear explanation, the following descriptions are provided in the condition where a sectional shape of the second base portion 222a is the symmetrical hexagon in which the second inclined side surface S2 is a straight line, as shown in FIG. 2B.

It should be noted that, in the present embodiment, the height D2 of each of the second auxiliary optical structures 224 may be less than the height H2 of each of the second optical structures 222; or the height D2 of each of the second auxiliary optical structures 224 may be equal to the height H2 of each of the second optical structures 222, and a contour of each of the second auxiliary optical structures 224 together with each of the second optical structures 222 may be of the same size (not illustrated).

Specifically, in the present embodiment, when the curvature radius R2 of the second arc surface C2 and the curvature radius R2' of the second auxiliary arc surface A2 of the optical film 20 are less than 100 μm, an included angle θ2 between each of the second inclined side surfaces S2 and the second bottom surface B2 is less than 90 degrees, and the height H2 of each of the second optical structures 222 and the height W2 of the second bottom surface B2 in the arranging direction V2 satisfy a relational expression: $0.1 \leq H2/W2 \leq 10$; and more preferably, when the height H2 of each of the second optical structures 222 and the height W2 of the second bottom surface B2 in the arranging direction V2 satisfy a relational expression: $1 \leq H2/W2 \leq 1.5$, the spot light source with limited quantity and arranged in arrays may compose the uniform planar light source.

In addition to the above, the first material layer 120 and the second material layer 220 may include the same shape and same dimension, the first material layer 120 and the second material layer 220 may include the same shape but different dimension, or the height of each of the auxiliary optical structures is equal to the height of each of the optical structures in any one of the first material layer 120 and the second material layer 220, and the contour of each of the auxiliary optical structures and each of the optical structures is of the same size. Particularly, when structural shapes of the first material layer 120 and the second material layer 220 are different, the spot light source with limited quantity and arranged in arrays may compose the planar light source which is more uniform.

For instance, referring to Table 1 below, in the present embodiment, a simulation is performed by using light emitting diodes arranged in 3×3 array with intervals being 10 cm as the spot light source, and disposing the optical film 20 at the place that is 10 cm from the spot light source. The RMS value is 0.88 in condition where the curvature radii R1, R1', R2 and R2' of the first arc surface C1, the first auxiliary arc surface A1, the second arc surface C2 and the second auxiliary arc surface A2 of the optical film 20 are 10 μm; the height H1 of each of the first optical structures 122 and the height H2 of each of the second optical structures 222 are 60 μm; and a total of the width W1 of each of the first optical structures 122 in the arranging direction V1 and the width W1' of each of the first auxiliary optical structures 124 in the arranging direction V1 and a total of the width W2 of each of the second optical structures 222 in the arranging direction V2 and the width W2' of each of the second auxiliary optical structures 224 in the arranging direction V2 are 64 μm. The RMS value is 0.87 in the condition where the detection area is 30×30 cm² and the pixel amount is 300×300, the curvature radii R1, R1', R2 and R2' of the first arc surface C1, the first auxiliary arc surface A1, the second arc surface C2 and the second auxiliary arc surface A2 of the optical film 20 are 10 μm; the height H1 of each of the first optical structures 122 is 30 μm; the height H2 of each of the second optical structures 222 is 60 μm; a total of the width W1 of each of the first optical structures 122 in the arranging direction V1 and the width W1' of each of the first auxiliary optical structures 124 in the arranging direction V1 is 50 μm; and a total of the width W2 of each of the second optical structures 222 in the arranging direction V2 and the width W2' of each of the second auxiliary optical structures 224 in the arranging direction V2 is 64 μm. The RMS value is 0.66 in condition where the curvature radii R1, R1', R2 and R2' of the first arc surface C1, the first auxiliary arc surface A1, the second arc surface C2 and the second auxiliary arc surface A2 of the optical film 20 are 10 μm; the height H1 of each of the first optical structures 122 and the height H2 of each of the first auxiliary optical structures 124 are 30 μm; the height H2 of each of the second optical structures 222 is 60 μm; a total of the width W1 of each of the first optical structures 122 in the arranging direction V1 and the width W1' of each of the first auxiliary optical structures 124 in the arranging direction V1 is 60 μm; and a total of the width W2 of each of the second optical structures 222 in the arranging direction V2 and the width W2' of each of the second auxiliary optical structures 224 in the arranging direction V2 is 64 μm. Because the uniformity of light ray is inversely proportional to the RMS value, it can be known that, when the structural shapes of the first material layer 120 and the second material layer 220 are different, the spot light source with limited quantity and arranged in arrays may compose the planar light source which is more uniform.

TABLE 1 simulation results including RMS values and light ray distribution images under different conditions.

| | R1/R1'/ R2/R2' (μm) | H1/ H2 (μm) | W1 + W1'/ W2 + W2' (μm) | RMS | Light ray distribution image |
|---|---|---|---|---|---|
| First material layer | 10 | 60 | 64 | 0.88 | ■ |
| Second material layer | 10 | 60 | 64 | | |
| First material layer | 10 | 30 | 50 | 0.67 | ■ |
| Second material layer | 10 | 60 | 64 | | |
| First material layer | 10 | 30(=D1) | 60 | 0.66 | ■ |
| Second material layer | 10 | 60 | 64 | | |

On the other hand, referring to Table 2 below, in the present embodiment, a simulation is performed by using light emitting diodes arranged in 3×3 array with intervals being 10 cm as the spot light source, and disposing the optical film 20 at the place that is 10 cm from the spot light source. The RMS value is 1.2 in the condition where the detection area is 30×30 cm² and the pixel amount is 300×300, the curvature radii R1, R1', R2 and R2' of the first arc surface C1, the first auxiliary arc surface A1, the second arc surface C2 and the second auxiliary arc surface A2 of the optical film 20 are 10 μm; the height H1 of each of the first optical structures 122 is 50 μm; the height H2 of each of the second optical structures 222 is 60

μm; the width W1 of each of the first optical structures 122 in the arranging direction V1 is 46 μm; and the width W2 of each of the second optical structures 222 in the arranging direction V2 is 44 μm. The RMS value is 0.6 in the condition where the detection area is 30×30 cm² and the pixel amount is 300×300, the curvature radii R1, R1', R2 and R2' of the first arc surface C1, the first auxiliary arc surface A1, the second arc surface C2 and the second auxiliary arc surface A2 of the optical film 20 are 10 μm; the height H1 of each of the first optical structures 122 is 60 μm; the height H2 of each of the second optical structures 222 is 50 μm; the width W1 of each of the first optical structures 122 in the arranging direction V1 is 44 μm; and the width W2 of each of the second optical structures 222 in the arranging direction V2 is 46 μm. Because the uniformity of light ray is inversely proportional to the RMS value, it can be known that, the spot light source with limited quantity and arranged in arrays may compose the planar light source which is more uniform when the structural shapes of the first material layer 120 and the second material layer 220 are different, the height H2 of each of the second optical structures 222 is less than the height H1 of each of the first optical structures 122, and the width W2 of each of the second optical structures 222 in the arranging direction V2 is greater than the width W1 of each of the first optical structures 122 in the arranging direction V1.

TABLE 2 simulation results including RMS values and light ray distribution images under different conditions.

| | R1/R1' R2/R2' (μm) | H1/ H2 (μm) | W1/ W2 (μm) | RMS | Light ray distribution image |
|---|---|---|---|---|---|
| First material layer | 10 | 50 | 46 | 1.2 | ■ |
| Second material layer | 10 | 60 | 44 | | |
| First material layer | 10 | 60 | 44 | 0.6 | ▨ |
| Second material layer | 10 | 50 | 46 | | |

For clear explanation, the following descriptions are all provided in the condition where the first material layer 120 and the second material layer 220 have the same shape and same dimension. Particularly, the following descriptions are provided in condition where the curvature radii R1, R1', R2 and R2' of the first arc surface C1, the first auxiliary arc surface A1, the second arc surface C2 and the second auxiliary arc surface A2 of the optical film 20 are 10 μm; the height H1 of each of the first optical structures 122 and the height H2 of each of the second optical structures 222 are 60 μm; and a total of the width W1 of each of the first optical structures 122 and the width W1' of each of the first auxiliary optical structures 124 in the arranging direction V1 and a total of the width W2 of each of the second optical structures 222 and the width W2' of each of the second auxiliary optical structures 224 are 64 μm.

Further, in the present embodiment, refractive indexes of the second optical structures 222 and the second auxiliary optical structures 224 of the second material layer 220 may be identical, refractive indexes of the first optical structures 122 and the first auxiliary optical structures 124 of the first material layer 120 may be identical, and refraction indexes of the second material layer 220, the substrate 110 and the first material layer 120 may be identical or not identical. Particularly, when the refractive index of the first material layer 120 is greater than the refractive index of the substrate 110 and the refractive index of the substrate 110 is greater than the refractive index of the second material layer 220 (e.g., the refractive index of the first material layer 12 is between 1.6 and 1.65, the refractive index of the substrate 110 is between 1.55 and 1.6, and the refractive index of the second material layer 220 is between 1.5 and 1.55), the spot light source with limited quantity and arranged in arrays may compose the planar light source which is more uniform.

For instance, in the present embodiment, a simulation is performed by using light emitting diodes arranged in 3×3 array with intervals being 10 cm as the spot light source, and disposing the optical film 20 at the place that is 10 cm from the spot light source. The RMS value is 0.96 in condition where the refractive index of the first material layer 120, the refractive index of the substrate 110 and the refractive index of the second material layer 220 are all 1.54. The RMS value is 0.89 in condition where the refractive index of the first material layer 120 is 1.54, the refractive index of the substrate 110 is 1.59, and the refractive index of the second material layer 220 is 1.64. Because the uniformity of light ray is inversely proportional to the RMS value, it can be known that, when the refractive index of the first material layer 120 is greater than the refractive index of the substrate 110 and the refractive index of the substrate 110 is greater than the refractive index of the second material layer 220, the spot light source with limited quantity and arranged in arrays may compose the planar light source which is more uniform.

Figure 3:
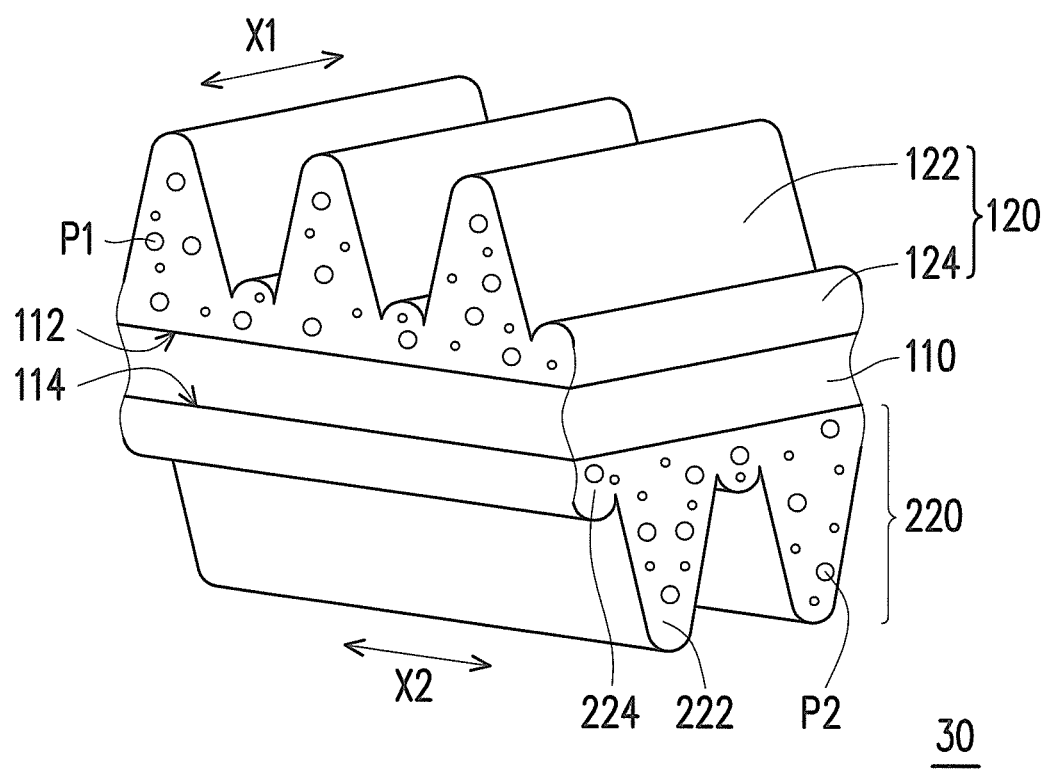
FIG. 3 is a three-dimensional view of an optical film according to third embodiment of the invention.

FIG. 3 is a three-dimensional view of an optical film according to third embodiment of the invention. Referring to FIG. 3, in the present embodiment, an optical film 30 is similar to the optical film 20, thus similar components are represented by the same reference number to include similar functions, and the descriptions thereof are omitted. A major different between the optical film 30 and the optical film 20 is that in the optical film 30, the first material layer 120 further includes a plurality of first optical particles P1 distributed in the first optical structures 122 and the first auxiliary optical structures 124, and the second material layer 220 further includes a plurality of optical particles P2 distributed in the second optical structures 222 and the second auxiliary optical structures 224.

Specifically, in the present embodiment, a refractive index of each of the first optical particles P1 is different from the refractive indexes of the first optical structures 122 and the first auxiliary optical structures 124, and a refractive index of each of the second optical particles P2 is different from the refractive indexes of the second optical structures 222 and the second auxiliary optical structures 224. Particularly, the spot light source with limited quantity and arranged in arrays may compose the planar light source which is more uniform when diameters of each of the first optical particles P1 and each of the second optical particles P2 are between 0.1 μm and 30 μm, percentage by weight of each of the first optical particles P1 relative to the first material layer 120 and percentage by weight of each of the second optical particles P2 relative to the second material layer 220 are between 0.1 wt % and 30 wt %, and the refractive indexes of the first optical particles P1 and the second optical particles P2 are between 1.3 and 1.9.

For instance, in the present embodiment, a simulation is performed by using light emitting diodes arranged in 3×3 array with intervals being 10 cm as the spot light source, and disposing the optical film 30 at the place that is 10 cm from the spot light source in the condition where the refractive indexes of the first material layer 120, the substrate 110 and the second material layer 220 are all 1.54. The RMS value is 0.94 in the condition where the first optical particles P1 are not included in the first material layer 120, and the second optical particles P2 are not included in the second material layer 220. The RMS value is 0.46 in the condition where the first material layer 120 includes the first optical particles P1 having the refractive index being 1.49 and the percentage by weight being 1 wt %, and the second material layer 220 includes the second optical particles P2 having the refractive index being 1.49 and the percentage by weight being 1 wt %. The RMS value is 0.42 in the condition where the first material layer 120 includes the first optical particles P1 having the refractive index being 1.49 and the percentage by weight being 2 wt %, and the second material layer 220 includes the second optical particles P2 having the refractive index being 1.49 and the percentage by weight being 2 wt. Because the uniformity of light ray is inversely proportional to the RMS value, it can be known that, in the condition where the refractive indexes of the first material layer 120, the substrate 110 and the second material layer 220 are identical, by doping the first optical particles P1 having the refractive index different from the refractive indexes of the first optical structures 122 and the first auxiliary optical structures 124 into the first material layer 120, and doping the second optical particles P2 having the refractive index different from the refractive indexes of the second optical structures 222 and the second auxiliary optical structures 224 into the second material layer 220, with increases in the percentage by weight of the doping, the light ray distribution of the spot light source with limited quantity and arranged in arrays may be more uniform.

On the other hand, in the present embodiment, a simulation is performed by using light emitting diodes arranged in 3×3 array with intervals being 10 cm as the spot light source, and disposing the optical film 30 at the place that is 10 cm from the spot light source in the condition where the refractive index of the first material layer is 1.64, the refractive index of the substrate 110 is 1.59, the refractive index of the refractive index of the second material layer 220 is 1.54, and the refractive indexes of the first optical particles P1 and the second optical particles P2 are 1.49. The RMS value is 0.62 in the condition where the first material layer 120 includes the first optical particles P1 having the percentage by weight being 1 wt % and the second material layer 220 includes the second optical particles P2 having and the percentage by weight being 1 wt %. The RMS value is 0.59 in the condition where the first material layer 120 includes the first optical particles P1 having the percentage by weight being 2 wt % and the second material layer 220 includes the second optical particles P2 having and the percentage by weight being 2 wt %. Because the uniformity of light ray is inversely proportional to the RMS value, it can be known that, in the condition where the refractive index of the first material layer 120 is greater than the refractive index of the substrate 110 and the refractive index of the substrate 110 is greater than the refractive index of the second material layer 220, by doping the first optical particles P1 having the refractive index different from the refractive indexes of the first optical structures 122 and the first auxiliary optical structures 124 into the first material layer 120, and doping the second optical particles P2 having the refractive index different from the refractive indexes of the second optical structures 222 and the second auxiliary optical structures 224 into the second material layer 220, with increases in the percentage by weight of the doping, the spot light source with limited quantity and arranged in arrays may compose the planar light source which is more uniform.

Further, referring to Table 3 below, as described above, in the present embodiment, a simulated RMS value is obtained in the condition where the refractive indexes of the first material layer 120, the substrate 110 and the second material layer 220 are identical, by doping the first optical particles P1 having the refractive index different from the refractive indexes of the first optical structures 122 and the first auxiliary optical structures 124 into the first material layer 120, and doping the second optical particles P2 having the refractive index different from the refractive indexes of the second optical structures 222 and the second auxiliary optical structures 224 into the second material layer 220. The obtained simulated RMS value is relatively greater as in comparison with a simulated RMS value obtained in the condition where the refractive index of the first material layer 120 is greater than the refractive index of the substrate 110 and the refractive index of the substrate 110 is greater than the refractive index of the second material layer 220, by doping the first optical particles P1 having the refractive index different from the refractive indexes of the first optical structures 122 and the first auxiliary optical structures 124 into the first material layer 120, and doping the second optical particles P2 having the refractive index different from the refractive indexes of the second optical structures 222 and the second auxiliary optical structures 224 into the second material layer 220. In other words, the spot light source with limited quantity and arranged in arrays may compose the planar light source which is more uniform in the condition where the refractive indexes of the first material layer 120, the substrate 110 and the second material layer 220 are identical, by doping the first optical particles P1 having the refractive index different from the refractive indexes of the first optical structures 122 and the first auxiliary optical structures 124 into the first material layer 120, and doping the second optical particles P2 having the refractive index different from the refractive indexes of the second optical structures 222 and the second auxiliary optical structures 224 into the second material layer 220.

On the other hand, referring again to Table 3 below, a simulated light ray distribution image is obtained in the condition where the refractive indexes of the first material layer 120, the substrate 110 and the second material layer 220 are identical, by doping the first optical particles P1 having the refractive index different from the refractive indexes of the first optical structures 122 and the first auxiliary optical structures 124 into the first material layer 120, and doping the second optical particles P2 having the refractive index different from the refractive indexes of the second optical structures 222 and the second auxiliary optical structures 224 into the second material layer 220. Dark fringe of the simulated light ray distribution image is relatively obvious as in comparison with that in a simulated light ray distribution image obtained in the condition where the refractive index of the first material layer 120 is greater than the refractive index of the substrate 110 and the refractive index of the substrate 110 is greater than the refractive index of the second material layer 220, by doping the first optical particles P1 having the refractive index different from the refractive indexes of the first optical structures 122 and the first auxiliary optical structures 124 into the first material layer 120, and doping the second optical particles P2 having the refractive index different from the refractive indexes of the second optical structures 222 and the second auxiliary optical structures 224 into the second material layer 220. In other words, the spot light source with limited quantity and arranged in arrays may compose the planar light source which is more uniform in the condition where the refractive index of the first material layer 120 is greater than the refractive index of the substrate 110 and the refractive index of the substrate 110 is greater than the refractive index of the second material layer 220, by doping the first optical particles P1 having the refractive index different from the refractive indexes of the first optical structures 122 and the first auxiliary optical structures 124 into the first material layer 120, and doping the second optical particles P2 having the refractive index different from the refractive indexes of the second optical structures 222 and the second auxiliary optical structures 224 into the second material layer 220.

TABLE 3 simulation results including RMS values and light ray distribution images under different conditions.

| Concentration for doping the optical particles | 0 (wt %) | | 1 (wt %) | | 2 (wt %) | |
|---|---|---|---|---|---|---|
| | RMS | Light ray distribution image | RMS | Light ray distribution image | RMS | Light ray distribution image |
| Refractive indexes of second material layer, substrate and first material layer are identical | 0.96 | | 0.46 | | 0.42 | |
| Refractive index of first material layer > refractive index of substrate > refractive index of second material layer | 0.89 | | 0.62 | | 0.59 | |

Figure 4A:
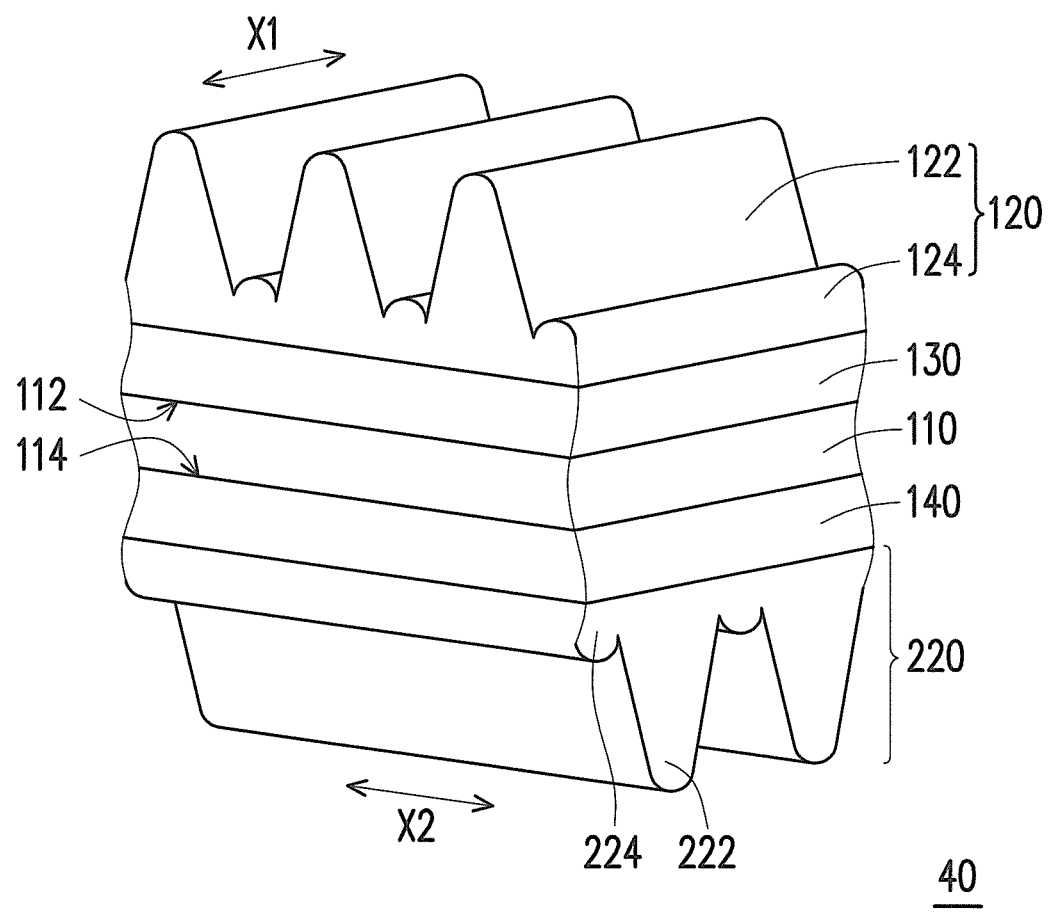
FIG. 4A is a three-dimensional view of an optical film according to fourth embodiment of the invention.
Figure 4B:
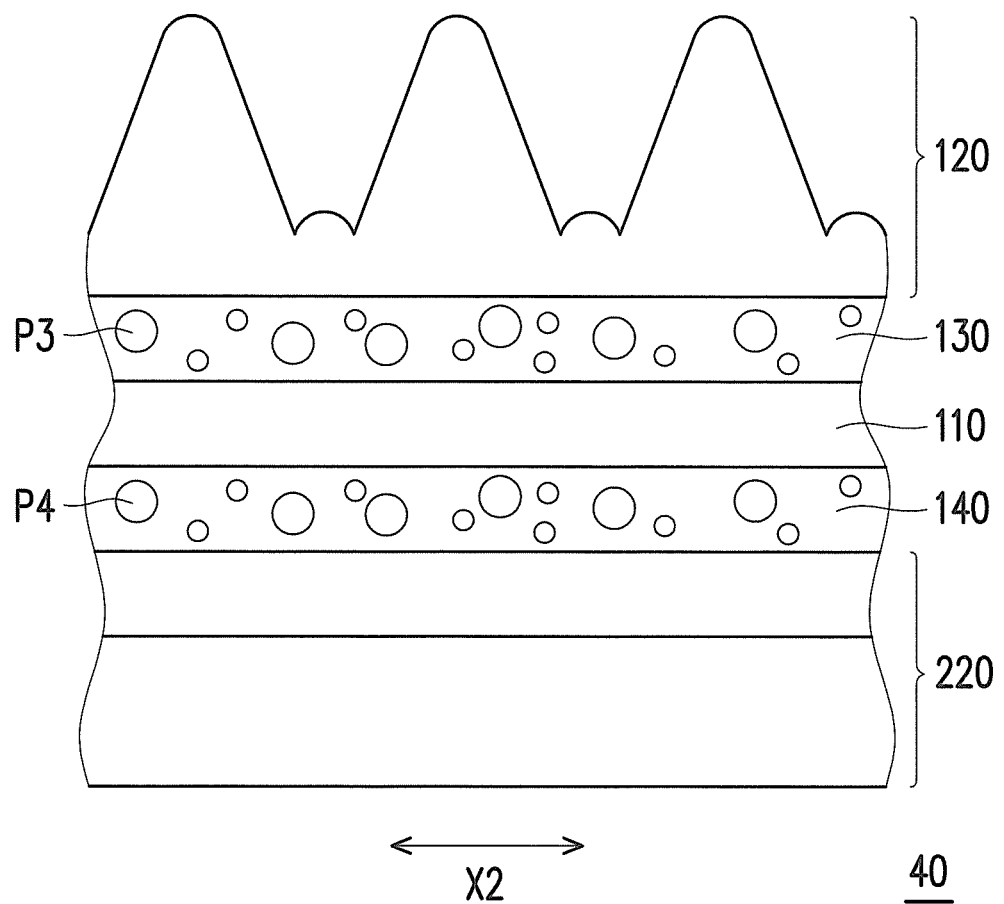
FIG. 4B is a cross-sectional view of the optical film according to FIG. 4A.

FIG. 4A is a three-dimensional view of an optical film according to fourth embodiment of the invention. FIG. 4B is a cross-sectional view of the optical film according to FIG. 4A, and has an orientation of section being a plane along the second extending direction X2 and perpendicular to the first surface 112. Referring to FIG. 4A and FIG. 4B, in the present embodiment, an optical film 40 is similar to the optical film 20, thus similar components are represented by the same reference number to include similar functions, and the descriptions thereof are omitted. A major different between the optical film 40 and the optical film 20 is that, the optical film 40 further includes a first adhesive layer 130 and a second adhesive layer 140.

Specifically, in the present embodiment, the first adhesive layer 130 is disposed between the first material layer 120 and the substrate 110, and the second adhesive layer 140 is disposed between the second material layer 220 and the substrate 110. Particularly, thicknesses of the first adhesive layer 130 and the second adhesive layer 140 are less than 500 μm, a thickness of the substrate 10 is between 50 μm and 250 μm, and heights of the first material layer 120 and the second material layer 220 are less than 500 μm. More preferably, in the present embodiment, the optical film 40 further includes a plurality of third optical particles P3 and a plurality of fourth optical particles P4.

Specifically, in the present embodiment, a refractive index of each of the third optical particles P3 is different from the refractive indexes of the first optical structures 122 and the first auxiliary optical structures 124, and a refractive index of each of the fourth optical particles P4 is different from the refractive indexes of the second optical structures 222 and the second auxiliary optical structures 224. Particularly, diameters of each of the third optical particles P3 and each of the fourth optical particles P4 are between 0.1 μm and 30 μm, percentage by weight of each of the third optical particles P3 relative to the first adhesive layer 130 and percentage by weight of each of the fourth optical particles P4 relative to the second adhesive layer 140 are between 0.1 wt % and 30 wt %, and the refractive indexes of the third optical particles P3 and the fourth optical particles P4 are between 1.3 and 1.9. Therein, the third optical particles P3 may be disposed between the substrate 110 and the first adhesive layer 130 (no illustrated), the fourth optical particles P4 may be disposed between the substrate 110 and the second adhesive layer 140 (no illustrated), the third optical particles P3 may be disposed in the first adhesive layer 130, or the fourth optical particles P4 may be disposed in the second adhesive layer 140. Accordingly, the spot light source with limited quantity and arranged in arrays may compose the planar light source which is more uniform.

As shown FIG. 4B, in which the third optical particles P3 are disposed in the first adhesive layer 130 and the fourth optical particles P4 are disposed in the second adhesive layer 140, for example. In the present embodiment, a simulation is performed by using light emitting diodes arranged in 3×3 array with intervals being 10 cm as the spot light source, and disposing the optical film 40 at the place that is 10 cm from the spot light source in the condition where the thicknesses of the first adhesive layer 130 and the second adhesive layer are 75 μm, the thickness of the substrate 110 is 50 μm, and the refractive indexes of the first material layer 120, the substrate 110 and the second material layer 220 are all 1.53. The RMS value is 0.87 in the condition where the third optical particles P3 are not included in the first adhesive layer 130 and the fourth optical particles P4 are not included in the second adhesive layer 140. The RMS value is 0.57 in the condition where the first adhesive layer 130 includes the third optical particles P3 having the refractive index being 1.49 and the percentage by weight being 1 wt %, and the second adhesive layer 140 includes the fourth optical particles P4 having the refractive index being 1.49 and the percentage by weight being 1 wt %. The RMS value is 0.56 in the condition where the first adhesive layer 130 includes the third optical particles P3 having the refractive index being 1.49 and the percentage by weight being 2 wt %, and the second adhesive layer 140 includes the fourth optical particles P4 having the refractive index being 1.49 and the percentage by weight being 2 wt %. The RMS value is 0.4 in the condition where the first adhesive layer 130 includes the third optical particles P3 having the refractive index being 1.49 and the percentage by weight being 3 wt %, and the second adhesive layer 140 includes the fourth optical particles P4 having the refractive index being 1.49 and the percentage by weight being 3 wt %. Because the uniformity of light ray is inversely proportional to the RMS value, it can be known that, in the condition where the refractive indexes of the first material layer 120, the substrate 110 and the second material layer 220 are identical, by doping the third optical particles P3 having the refractive index different from the refractive indexes of the first optical structures 122 and the first auxiliary optical structures 124 into the first adhesive layer 130, and doping the fourth optical particles P4 having the refractive index different from the refractive indexes of the second optical structures 222 and the second auxiliary optical structures 224 into the second adhesive layer 140, with increases in the percentage by weight of the doping, the spot light source with limited quantity and arranged in arrays may compose the planar light source which is more uniform.

In addition to the above, it is also possible that in the optical film 40, the first material layer 120 further includes a plurality of first optical particles P1 (not illustrated) distributed in the first optical structures 122 and the first auxiliary optical structures 124, and the second material layer 220 further includes a plurality of optical particles P2 (not illustrated) distributed in the second optical structures 222 and the second auxiliary optical structures 224. Accordingly, the optical film 40 will be similar to the optical film 30, and thus repeated descriptions thereof are omitted hereinafter.

Further, in the optical film 40, refractive indexes of the second optical structures 222 and the second auxiliary optical structures 224 of the second material layer 220 may be identical, refractive indexes of the first auxiliary optical structures 124 and the first optical structures 122 of the first material layer 120 may be identical, and refraction indexes of the second material layer 220, the substrate 110 and the first material layer 120 may be identical or not identical. Particularly, it is assumed hereinafter that the refractive index of the first material layer 120 is greater than the refractive index of the substrate 110, and the refractive index of the substrate 110 is greater than the second material layer 220. For example, the refractive index of the first material layer 120 is between 1.6 and 1.65, the refractive index of the substrate 110 is between 1.55 and 1.6, and the refractive index of the second material layer 220 is between 1.5 and 1.55. Accordingly, the optical film 40 will be similar to the optical film 20, and thus repeated descriptions thereof are omitted hereinafter.

Figure 1E:
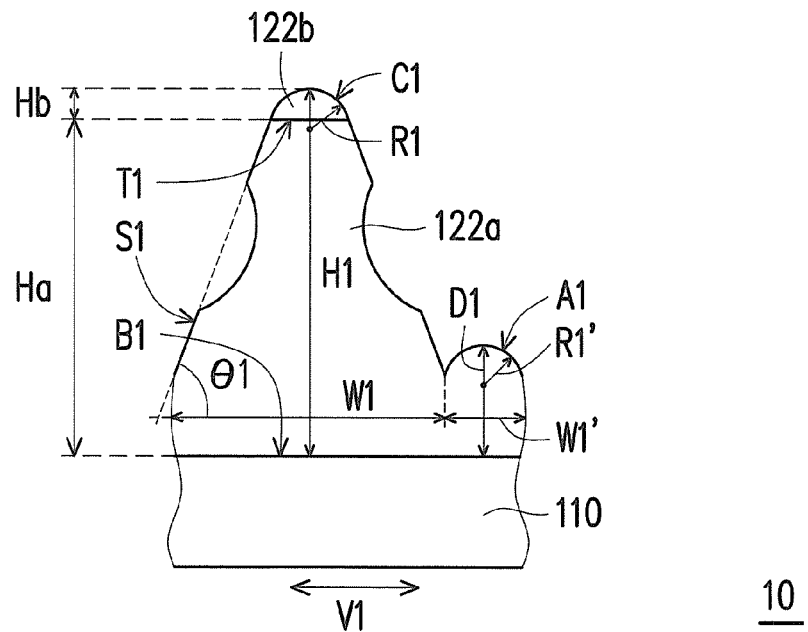
FIG. 1E is still another cross-sectional view of the optical film according to FIG. 1A.
Figure 5A:
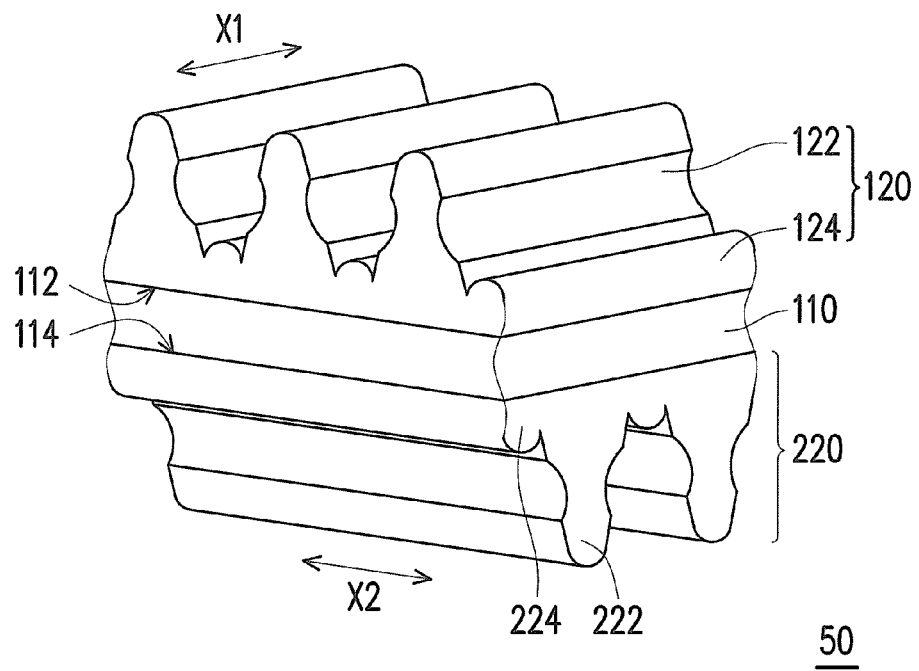
FIG. 5A is a three-dimensional view of an optical film according to fifth embodiment of the invention.
Figure 5B:
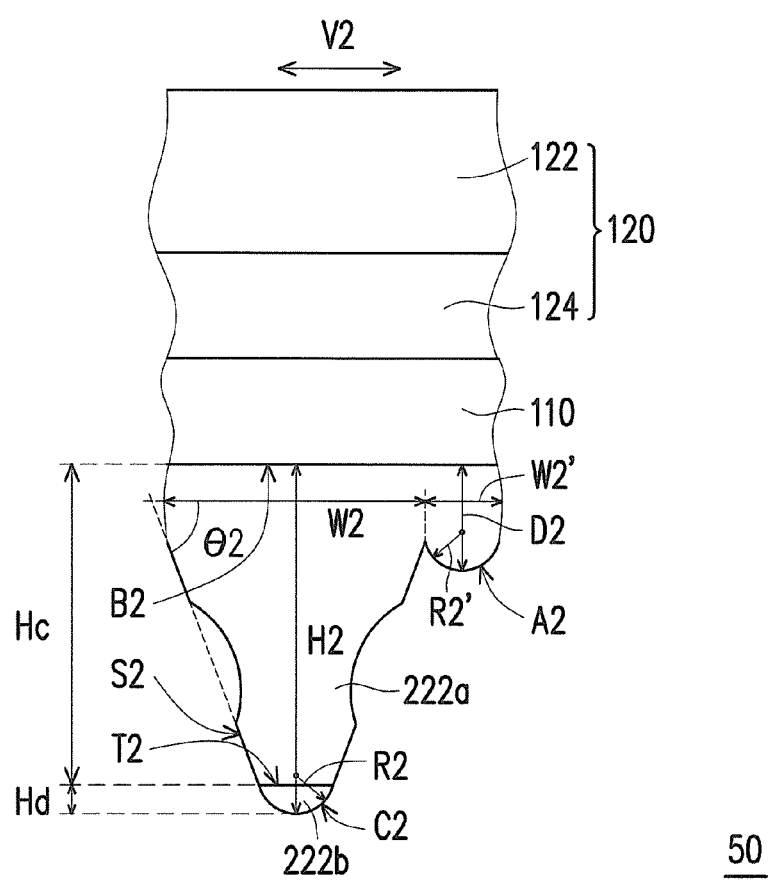
FIG. 5B is a cross-sectional view of the optical film according to FIG. 5A.

FIG. 5A is a three-dimensional view of an optical film according to fifth embodiment of the invention. FIG. 5B is a cross-sectional view of the optical film according to FIG. 5A, and has an orientation of section being a plane along an arranging direction V2 and perpendicular to a second surface 114. Referring to FIG. 1E, FIG. 5A and FIG. 5B, in the present embodiment, an optical film 50 is similar to the optical film 20, thus similar components are represented by the same reference number to include similar functions, and the descriptions thereof are omitted. A major difference between the optical film 50 and the optical film 20 is that in the optical film 50, the first inclined side surface S1 of the first material layer 120 and the second inclined side surface S2 of the second material layer 220 each is composed of two plane surfaces and one arc surface.

Specifically, in the present embodiment, a line intersecting the plane surfaces and the arc surface on the first inclined side surface S1 of the first material layer 120 is parallel to the first extending direction X1, and the arc surface is disposed between the two plane surfaces. A line intersecting the plane surfaces and the arc surface on the second inclined side surface S2 of the second material layer 220 is parallel to the second extending direction X2, and the arc surface is disposed between the two plane surfaces. Accordingly, that the spot light source with limited quantity and arranged in arrays may compose the planar light source which is more uniform.

For instance, referring to Table 4 below, in the present embodiment, a simulation is performed by using light emitting diodes arranged in 3×3 array with intervals being 10 cm as the spot light source, and disposing the optical film 50 with the first material layer 120 and the second material layer 220 having identical structural shape at the place that is 10 cm from the spot light source. In condition where the curvature radii R1, R1', R2 and R2' of the first arc surface C1, the first auxiliary arc surface A1, the second arc surface C2 and the second auxiliary arc surface A2 of the optical film 50 are 10 µm; the height H1 of each of the first optical structures 122 and the height H2 of each of the second optical structures 222 are 60 µm; and a total of the width W1 of each of the first optical structures 122 in the arranging direction V1 and the width W1' of each of the first auxiliary optical structures 124 in the arranging direction V1 and a total of the width W2 of each of the second optical structures 222 in the arranging direction V2 and the width W2' of each of the second auxiliary optical structures 224 in the arranging direction V2 are 64 µm; and particularly, the RMS value is 0.56 in the condition where lengths of two straight lines in each of the sectional shapes of the first inclined side surface S1 and the second inclined side surface S2 are 13 µm, a distance between the two straight lines is 27 µm, and a short distance between a center of the arc line to a straight extending line is 4 µm. As compared to the optical film 20 as described above, in which in the condition where the curvature radii R1, R1', R2 and R2' of the first arc surface C1, the first auxiliary arc surface A1, the second arc surface C2 and the second auxiliary arc surface A2 are 10 µm, the height H1 of each of the first optical structures 122 and the height H2 of each of the second optical structures 222 are 60 µm, and a total of the width W1 of each of the first optical structures 122 in the arranging direction V1 and the width W1' of each of the first auxiliary optical structures 124 in the arranging direction V1 and a total of the width W2 of each of the second optical structures 222 in the arranging direction V2 and the width W2' of each of the second auxiliary optical structures 224 in the arranging direction V2 are 64 µm, the RMS value is 0.88. In view of above, it can be known that the spot light source with limited quantity and arranged in arrays may compose the planar light source which is more uniform when the first inclined side surface S1 of the first material layer 120 and the second inclined side surface S2 of the second material layer 220 are composed of two planes and one arc surface.

Moreover, in the present embodiment, refractive indexes of the second optical structures 222 and the second auxiliary optical structures 224 in the second material layer 220 may be identical, refractive indexes of the first optical structures 122 and the first auxiliary optical structures 124 in the first material layer 120 may be identical, and refraction indexes of the second material layer 220, the substrate 110 and the first material layer 120 may be identical or not identical. Alternatively, it is also possible that the first material layer 120 further includes a plurality of first optical particles P1 distributed in the first optical structures 122 and the first auxiliary optical structures 124, and the second material layer 220 further includes a plurality of optical particles P2 distributed in the second optical structures 222 and the second auxiliary optical structures 224. Furthermore, the optical film 50 further includes a first adhesive layer 130 and a second adhesive layer 140. Accordingly, the optical film 50 will be similar to the optical films 30 and 40, and thus repeated descriptions thereof are omitted hereinafter.

Figure 1F:
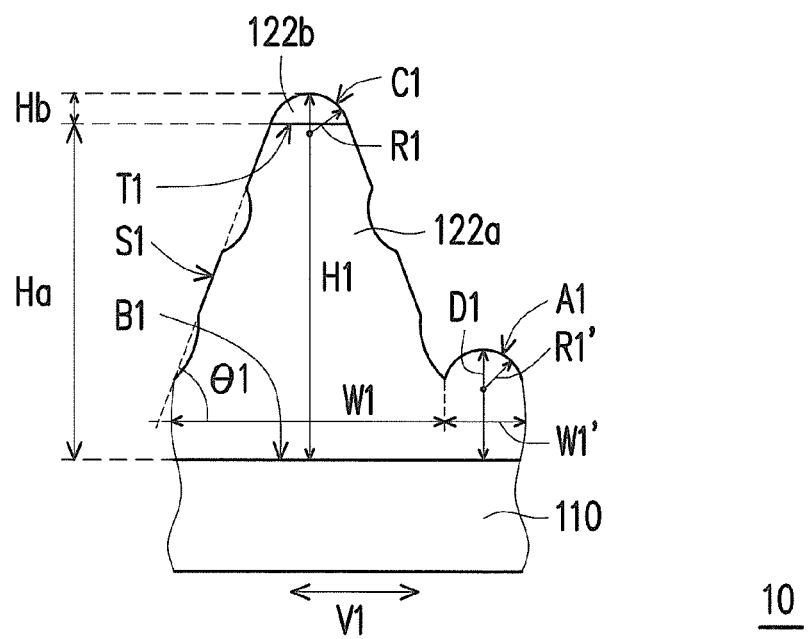
FIG. 1F is yet again another cross-sectional view of the optical film according to FIG. 1A.
Figure 6A:
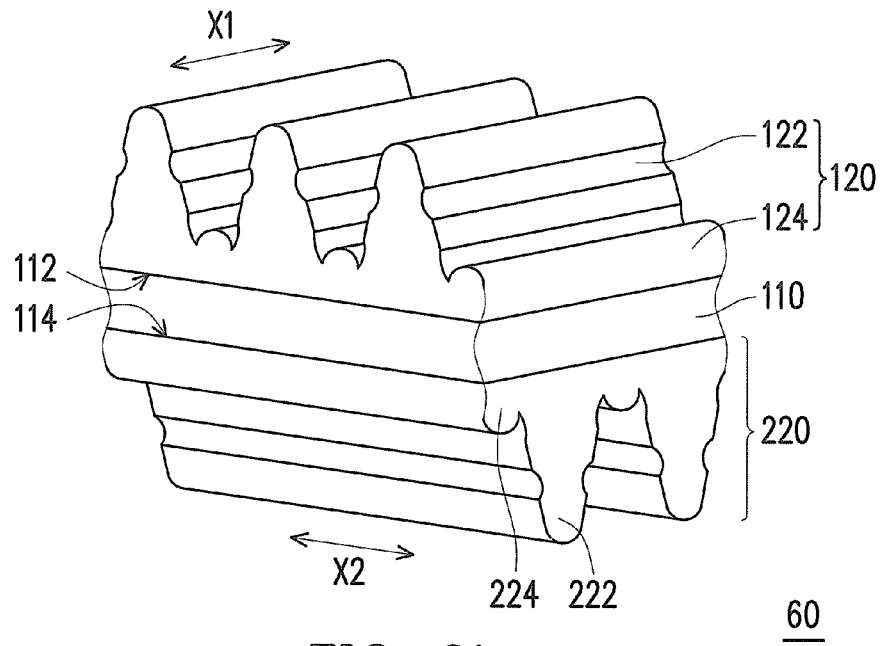
FIG. 6A is a three-dimensional view of an optical film according to sixth embodiment of the invention.
Figure 6B:
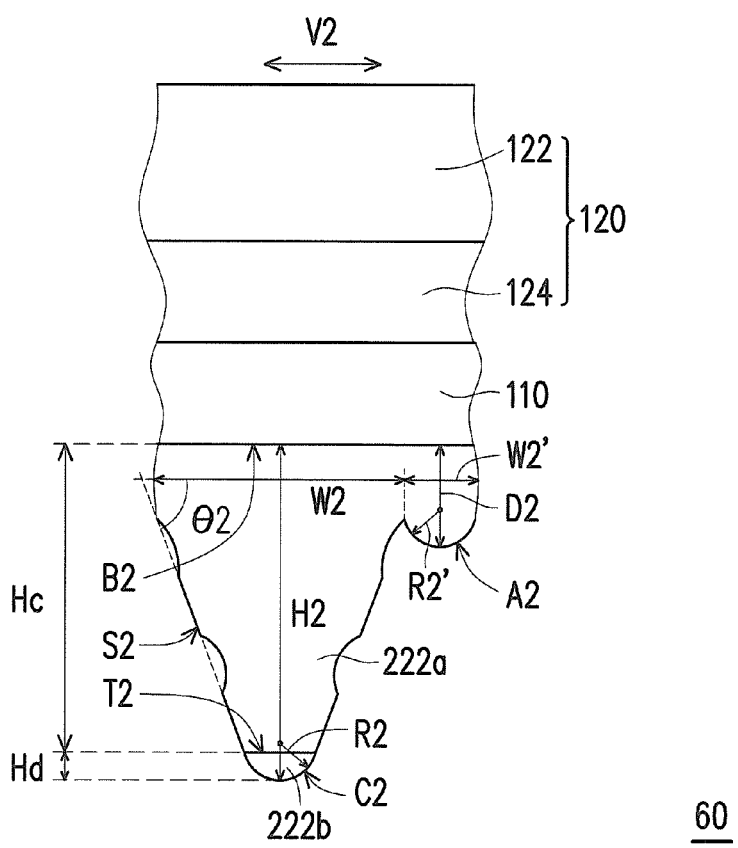
FIG. 6B is a cross-sectional view of the optical film according to FIG. 6A.

FIG. 6A is a three-dimensional view of an optical film according to sixth embodiment of the invention. FIG. 6B is a cross-sectional view of the optical film according to FIG. 6A, and has an orientation of section being a plane along an arranging direction V2 and perpendicular to a second surface 114. Referring to FIG. 1F, FIG. 6A and FIG. 6B, in the present embodiment, an optical film 60 is similar to the optical film 50, thus similar components are represented by the same reference number to include similar functions, and the descriptions thereof are omitted. A major difference between the optical film 60 and the optical film 50 is that in the optical film 60, the first inclined side surface S1 of the first material layer 120 and the second inclined side surface S2 of the second material layer 220 each is composed of a plurality of plane surfaces and a plurality of arc surfaces being alternately disposed.

Specifically, in the present embodiment, a line intersecting of the plane surfaces and the arc surfaces on the first inclined side surface S1 of the first material layer 120 is parallel to the first extending direction X1, and each the arc surfaces and each of the plane surfaces are alternately disposed. A line intersecting of the plane surfaces and the arc surfaces on the second inclined side surface S2 of the second material layer 220 is parallel to the second extending direction X2, and each of the arc surfaces and each of the plane surfaces are alternately disposed. Accordingly, the spot light source with limited quantity and arranged in arrays may compose the planar light source which is more uniform.

For instance, referring again to Table 4 below, in the present embodiment, a simulation is performed by using light emitting diodes arranged in 3×3 array with intervals being 10 cm as the spot light source, and disposing the optical film 60 with the first material layer 120 and the second material layer 220 having identical structural shape at the place that is 10 cm from the spot light source. In condition where the curvature radii R1, R1', R2 and R2' of the first arc surface C1, the first auxiliary arc surface A1, the second arc surface C2 and the second auxiliary arc surface A2 in the optical film 60 are 10 μm; the height H1 of each of the first optical structures 122 and the height H2 of each of the second optical structures 222 are 60 μm; and a total of the width W1 of each of the first optical structures 122 in the arranging direction V1 and the width W1' of each of the first auxiliary optical structures 124 in the arranging direction V1 and a total of the width W2 of each of the second optical structures 222 in the arranging direction V2 and the width W2' of each of the second auxiliary optical structures 224 in the arranging direction V2 are 64 μm; and particularly, the RMS value is 0.57 in the condition where lengths of a plurality of straight lines in each of the sectional shapes of the first inclined side surface S1 and the second inclined side surface S2 are 13 μm, an interval between each of the straight lines is 13 μm, a shortest distance between a center of the arc line (referring to the arc line in the first material layer 120 closest to the first base portion B1, and the arc line in the second material layer 220 closest to the second portion B2) to the straight extending line is 3 μm, and a shortest distance between a center of the arc line (referring to the arc line in the first material layer 120 nearest to the first base portion B1, and the arc line in the second material layer 220 nearest to the second portion B2) to the straight extending line is 1 μm. As compared to the optical film 20, in which when the curvature radii R1, R1', R2 and R2' of the first arc surface C1, the first auxiliary arc surface A1, the second arc surface C2 and the second auxiliary arc surface A2 are 10 μm, the height H1 of each of the first optical structures 122 and the height H2 of each of the second optical structures 222 are 60 μm, and a total of the width W1 of each of the first optical structures 122 in the arranging direction V1 and the width W1' of each of the first auxiliary optical structures 124 in the arranging direction V1 and a total of the width W2 of each of the second optical structures 222 in the arranging direction V2 and the width W2' of each of the second auxiliary optical structures 224 in the arranging direction V2 are 64 μm, the RMS value is 0.88. In view of above, when the first inclined side surface S1 of the first material layer 120 and the second inclined side surface S2 of the second material layer 220 are composed of a plurality of planes and a plurality of arc surfaces, the spot light source with limited quantity and arranged in arrays may compose the planar light source which is more uniform.

Moreover, in the present embodiment, refractive indexes of the second optical structures 222 and the second auxiliary optical structures 224 in the second material layer 220 may be identical, refractive indexes of the first optical structures 122 and the first auxiliary optical structures 124 in the first material layer 120 may be identical, and refraction indexes of the second material layer 220, the substrate 110 and the first material layer 120 may be identical or not identical. Alternatively, it is also possible that the first material layer 120 further includes a plurality of first optical particles P1 distributed in the first optical structures 122 and the first auxiliary optical structures 124, and the second material layer 220 further includes a plurality of optical particles P2 distributed in the second optical structures 222 and the second auxiliary optical structures 224. Furthermore, the optical film 60 further includes a first adhesive layer 130 and a second adhesive layer 140. Accordingly, the optical film 60 will be similar to the optical films 30 and 40, and thus repeated descriptions thereof are omitted hereinafter.

TABLE 4 simulation results including RMS values and light ray distribution images under different conditions.

| First inclined side surface, Second inclined side surface | One plane surface | | Two plane surfaces and one arc surface | | Multiple plane surfaces and multiple arc surfaces | |
|---|---|---|---|---|---|---|
| | RMS | Light ray distribution image | RMS | Light ray distribution image | RMS | Light ray distribution image |
| R1, R1', R2, R2' = 10 μm, H1/H2 = 60 μm, W1 + W1' = 6 μm, W2 + W2' = 64 μm | 0.88 | | 0.56 | | 0.57 | |

In summary, according to the optical film of the invention, in the condition where only one first material layer is provided, the curvature radii of the arc surface and the auxiliary arc surface of the optical structure are less than 100 μm, the included angle between each of the inclined side surfaces and the bottom surface is less than 90 degrees, and the height H1 of each optical structures and the width W1 of the bottom surface in the arranging direction satisfy the relational expression: $0.1 \leq H2/W2 \leq 10$; and more preferably, when the height H2 of each of the second optical structures 222 and the width W2 of the second bottom surface B2 in the arranging direction V2 satisfy the relational expression: $1 \leq H1/W1 \leq 1.5$, the spot light source with limited quantity and arranged in arrays may compose the uniform linear light source. Further, the spot light source with limited quantity and arranged in arrays may compose the planar light source which is more uniform in the condition where one first material layer and one second material layer are included at two sides of the substrate, and the structural shapes of the two material layers are different; and, the spot light source with limited quantity and arranged in arrays may compose the planar light source which is more uniform when the height of each of the second optical structures of the second material layer is less than the height of each of the first optical structures of the first material layer, and the width of each of the second optical structures of the second material layer in the arranging direction is greater than the width of each of the first optical structures of the first material layer in the arranging direction. When the refractive index of the first material layer is greater than the refractive index of the substrate and the refractive index of the substrate is greater than the refractive index of the second material layer, the spot light source with limited quantity and arranged in arrays may compose the planar light source which is more uniform. Further, the spot light source with limited quantity and arranged in arrays may compose the planar light source which is more uniform when the first inclined side surface of the first material layer and the second inclined side surface of the second material layer are the plane surface, the arc surface, or include the at least one plane surface and the at least one plane surface.

Furthermore, in the condition where the refractive indexes of the first material layer, the substrate and the second material layer are identical, by doping the first optical particles having the refractive index different from the refractive indexes of the first optical structures and the first auxiliary optical structures into the first material layer, and doping the second optical particles having the refractive index different from the refractive indexes of the second optical structures and the second auxiliary optical structures into the second material layer, with increases in the percentage by weight of the doping, the spot light source with limited quantity and arranged in arrays may compose the planar light source which is more uniform. In addition, in the condition where the refractive index of the first material layer is greater than the refractive index of the substrate and the refractive index of the substrate is greater than the refractive index of the second material layer, by doping the first optical particles having the refractive index different from the refractive indexes of the first optical structures and the first auxiliary optical structures into the first material layer, and doping the second optical particles having the refractive index different from the refractive indexes of the second optical structures and the second auxiliary optical structures into the second material layer, the bright and dark fringe phenomenon of the planar light source composed of the spot light source with limited quantity and arranged in arrays is less obvious, so as to accomplish the planar light source which is more uniform. Further, in the condition where the refractive indexes of the first material layer, the substrate and the second material layer are identical, by doping the third optical particles having the refractive index different from the refractive indexes of the first optical structures and the first auxiliary optical structures into the first adhesive layer, and doping the fourth optical particles having the refractive index different from the refractive indexes of the second optical structures and the second auxiliary optical structures into the second adhesive layer, with increases in the percentage by weight of the doping, the spot light source with limited quantity and arranged in arrays may compose the planar light source which is more uniform.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. An optical film, comprising:
    a substrate, having a first surface and a second surface opposite to the first surface; and
    a first material layer, comprising:
        a plurality of first optical structures, and each of the first optical structures comprising:
            a first base portion, having a first bottom surface connected to the first surface and a first top surface opposite to the first bottom surface; and
            a first rounded portion, disposed on the first top surface, and the first rounded portion having a first arc surface; and
        a plurality of first auxiliary optical structures, each of the first auxiliary optical structures having a first auxiliary arc surface, the first optical structures and the first auxiliary optical structures extending along a first extending direction, and the first optical structures and the first auxiliary optical structures being alternately arranged on the first surface in an arranging direction perpendicular to the first extending direction.

2. The optical film of claim 1, wherein curvature radii of the first arc surface and the first auxiliary arc surface are identical.

3. The optical film of claim 1, wherein curvature radii of the first arc surface and the first auxiliary arc surface are not identical.

4. The optical film of claim 1, wherein a height of each of the first optical structures is H1, a width of the first bottom surface in the arranging direction is W1, and H1 and W1 satisfy a relational expression as follows:

$$0.1 \leq H1/W1 \leq 10.$$

5. The optical film of claim 1, wherein a height of each of the first optical structures is H1, a width of the first bottom surface in the arranging direction is W1, and H1 and W1 satisfy a relational expression as follows:

$$1 \leq H1/W1 \leq 1.5.$$

6. The optical film of claim 1, wherein the first base portion of each of the first optical structures further comprises a plurality of first inclined side surfaces connected to the first bottom surface and the first top surface, and an included angle between each of the first inclined side surfaces and the first bottom surface is less than 90 degrees.

7. The optical film of claim 6, wherein each of the first inclined side surfaces is a plane surface.

8. The optical film of claim 6, wherein each of the first inclined side surfaces is an arc surface.

9. The optical film of claim 6, wherein each of the first inclined side surfaces comprises at least one plane surface and at least one arc surface.

10. The optical film of claim 1, further comprising:
a second material layer, comprising:
- a plurality of second optical structures, and each of the second optical structures comprising:
  - a second base portion, having a second bottom surface connected to the second surface and a second top surface opposite to the second bottom surface; and
  - a second rounded portion, disposed on the second top surface, and the second rounded portion having a second arc surface; and
- a plurality of second auxiliary optical structures, each of the second auxiliary optical structures having a second auxiliary arc surface, the second optical structures and the second auxiliary optical structures extending along a second extending direction, and the second optical structures and the second auxiliary optical structures being alternately arranged on the second surface in an arranging direction perpendicular to the second extending direction.

11. The optical film of claim 10, wherein curvature radii of the second arc surface and the second auxiliary arc surface are identical.

12. The optical film of claim 10, wherein curvature radii of the second arc surface and the second auxiliary arc surface are not identical.

13. The optical film of claim 10, wherein a height of each of the second optical structures is H2, a width of the second bottom surface in the arranging direction is W2, and H2 and W2 satisfy a relational expression as follows:

$$0.1 \leq H2/W2 \leq 10.$$

14. The optical film of claim 10, wherein a height of each of the second optical structures is H2, a width of the second bottom surface in the arranging direction is W2, and H2 and W2 satisfy a relational expression as follows:

$$1 \leq H2/W2 \leq 1.5.$$

15. The optical film of claim 10, wherein the second base portion of each of the second optical structures further comprises a plurality of second inclined side surfaces connected to the second bottom surface and the second top surface, and an included angle between each of the second inclined side surfaces and the second bottom surface is less than 90 degrees.

16. The optical film of claim 15, wherein each of the second inclined side surfaces is a plane surface.

17. The optical film of claim 15, wherein each of the second inclined side surfaces is an arc surface.

18. The optical film of claim 15, wherein each of the second inclined side surfaces comprises at least one plane surface and at least one arc surface.

19. The optical film of claim 10, wherein an included angle between the first extending direction and the second extending direction is between 90 degrees and 130 degrees.

20. The optical film of claim 10, wherein refractive indexes of the second optical structures and the second auxiliary optical structures in the second material layer are identical, refractive indexes of the first auxiliary optical structures and the first optical structures in the first material layer are identical, and refractive indexes of the second material layer, the substrate and the first material layer are identical.

21. The optical film of claim 10, wherein refractive indexes of the second optical structures and the second auxiliary optical structures in the second material layer are identical, refractive indexes of the first auxiliary optical structures and the first optical structures in the first material layer are identical, and refractive indexes of the second material layer, the substrate and the first material layer are not identical.

22. The optical film of claim 21, wherein the refractive index of the first material layer is greater than the refractive index of the substrate, and the refractive index of the substrate is greater than the refractive index of the second material layer.

23. The optical film of claim 1, wherein the first material layer further comprises a plurality of first optical particles distributed in the first optical structures and the first auxiliary optical structures, and a refractive index of each of the first optical particles is different from refractive indexes of the first optical structures and the first auxiliary optical structures.

24. The optical film of claim 10, wherein the second material layer further comprises a plurality of second optical particles distributed in the second optical structures and the second auxiliary optical structures, and a refractive index of each of the second optical particles is different from refractive indexes of the second optical structures and the second auxiliary optical structures.

25. The optical film of claim 10, further comprising a first adhesive layer, wherein the first adhesive layer is disposed between the first material layer and the substrate.

26. The optical film of claim 25, wherein the first adhesive layer has a plurality of third optical particles, and a refractive index of the third optical particles is different from refractive indexes of the first optical structures and the first auxiliary optical structures.

27. The optical film of claim 10, further comprising a second adhesive layer, wherein the second adhesive layer is disposed between the second material layer and the substrate.

28. The optical film of claim 27, wherein the second adhesive layer has a plurality of fourth optical particles, and a refractive index of the fourth optical particles is different from refractive indexes of the second optical structures and the second auxiliary optical structures.

* * * * *